UNITED STATES PATENT OFFICE.

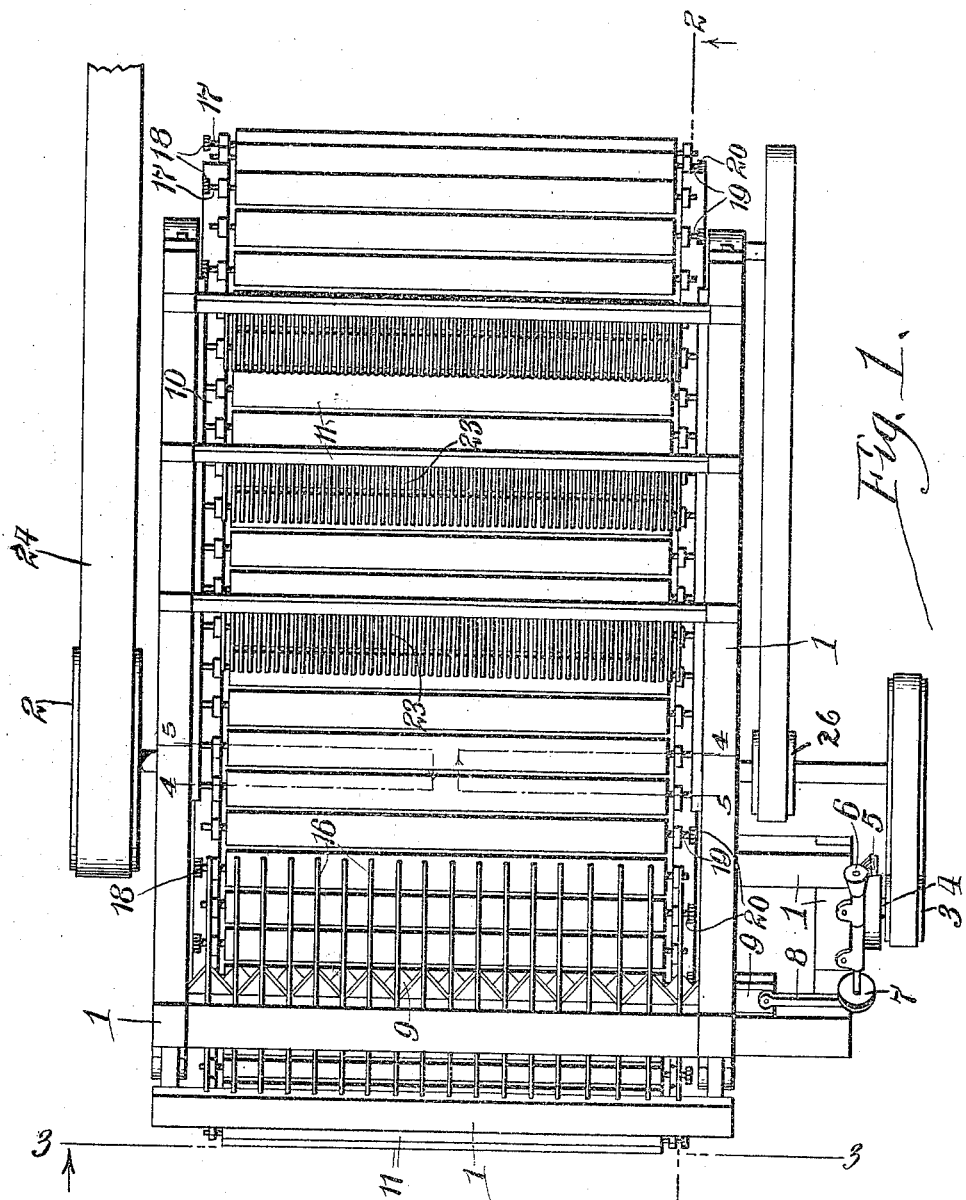

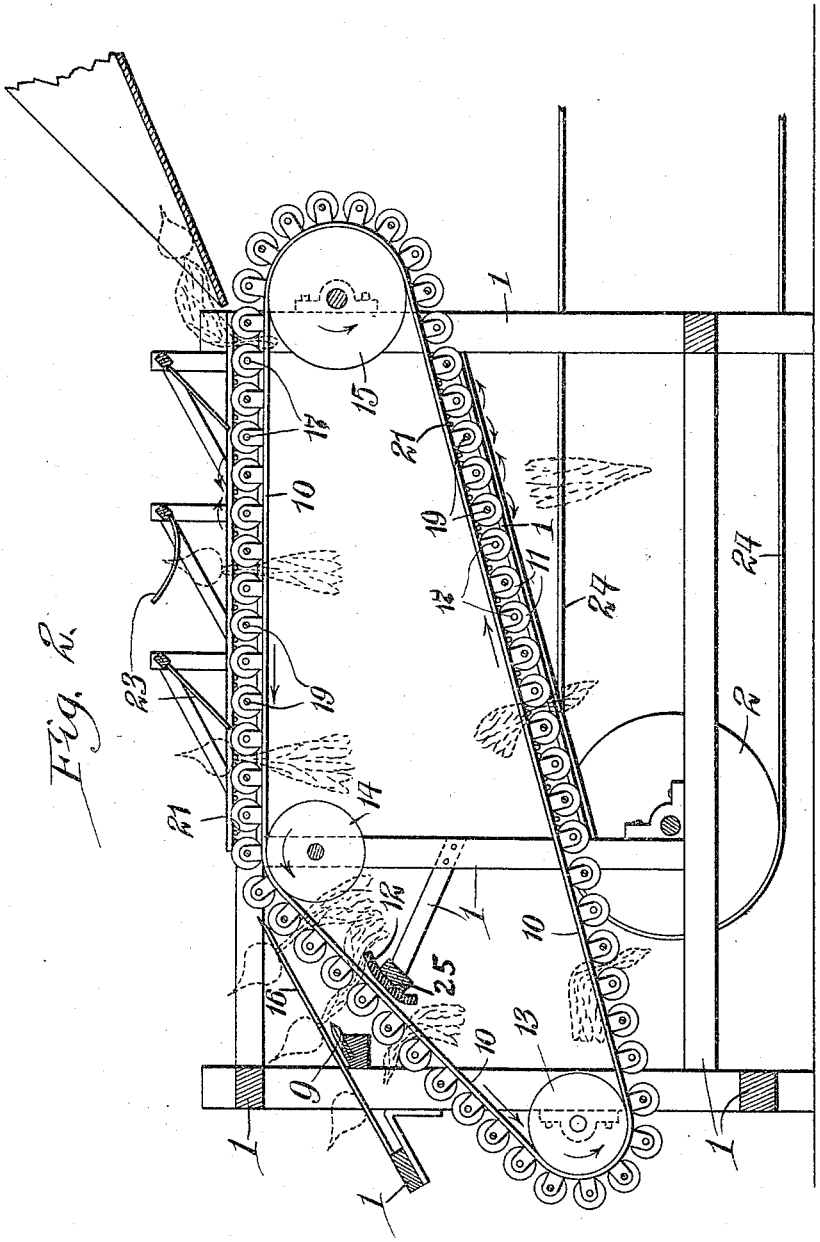

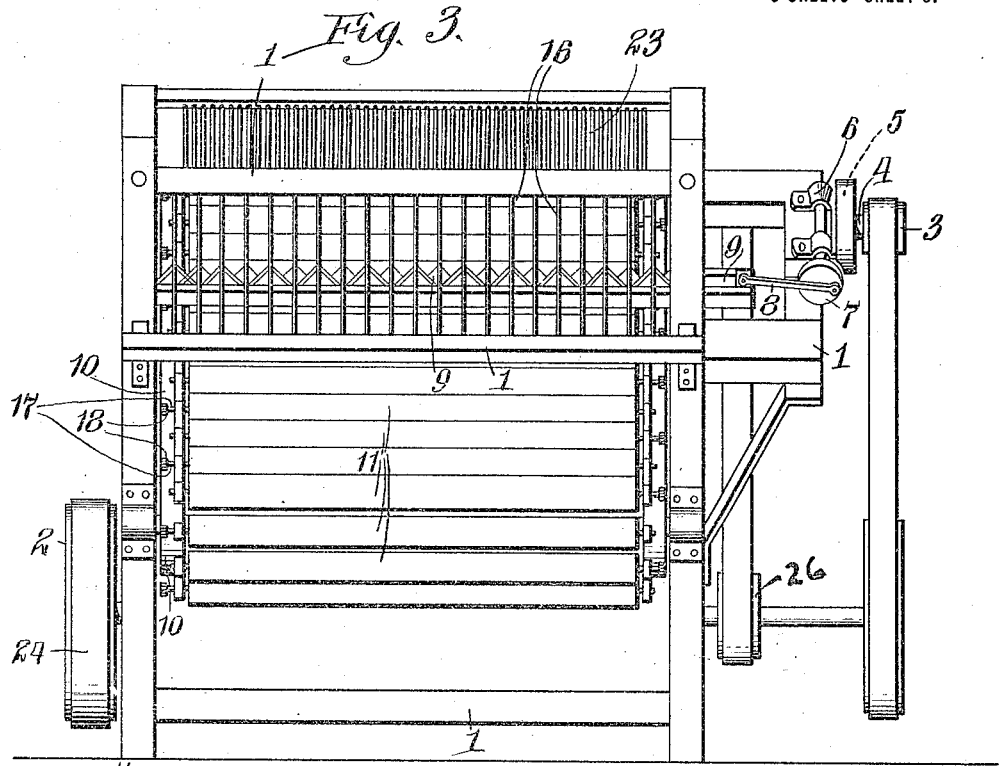
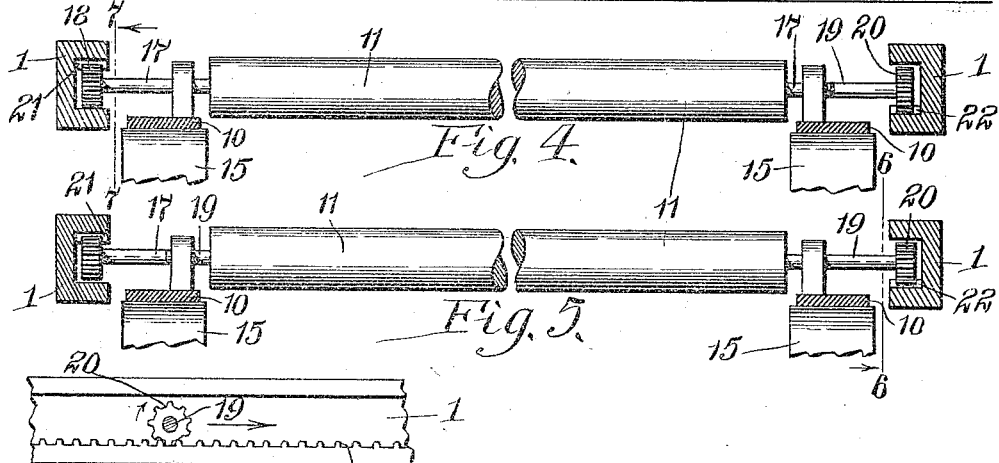
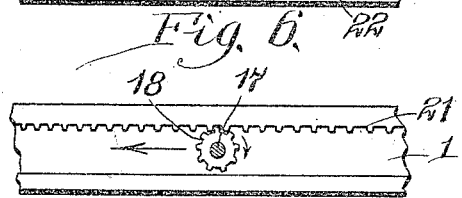

EPHRAIM BURDICK, OF CLEVELAND, OHIO.

VEGETABLE-TOPPING MACHINE.

1,294,766.  Specification of Letters Patent.  Patented Feb. 18, 1919.

Application filed June 19, 1918. Serial No. 240,776.

*To all whom it may concern:*

Be it known that I, EPHRAIM BURDICK, a citizen of the United States, residing at Cleveland, in the county of Cuyahoga and State of Ohio, have invented a new and useful Vegetable-Topping Machine, of which the following is a specification.

The object of my invention is to provide an improved vegetable topping machine for topping onions, beets, and so forth, which will automatically feed the vegetables to a knife blade and sever the tops from them without tearing. It is further my object to provide a machine of this type having a novel combination and arrangement of parts as hereinafter set forth and illustrated in the accompany drawings in which:

Figure 1 is a top plan of my machine;

Fig. 2 is a longitudinal section on line 2—2 of Fig. 1;

Fig. 3 is an end view at the knife end of the machine;

Fig. 4 is a vertical section on line 4—4 of Fig. 1;

Fig. 5 is a vertical section on line 5—5 of Fig. 1;

Fig. 6 is a section on line 6—6 of Fig. 5, and

Fig. 7 is a section on line 7—7 of Fig. 4.

Like numerals designate like parts throughout the views.

Referring to the accompanying drawings I provide a suitable main frame 1 having a drive pulley 2 belted to the engine. Operatively connected with pulley 2, I provide a pulley 3, as shown in Fig. 3, mounted on shaft 4, which carries a suitable inclosed bevel gear 5, arranged to mesh with gear 6, which in turn drives cam 7. Cam 7 in turn actuates arm 8, and that member reciprocates a suitable set of vegetable topping knives 9 which extend transversely of the machine at one end thereof. I provide a suitable conveyer belt 10 which carries a plurality of rollers 11, which engage and hold the tops of the vegetables as they are fed along in the machine.

The conveyer belt 10, as illustrated in Fig. 2, is mounted on large rollers 13, 14, and 15. Mounted above knives 9, I provide spaced inclined fingers 16, which raise the vegetables above the knives just sufficiently to insure the tops being severed at the position desired without bruising or mashing the vegetable. Fingers 16 preferably are made of steel.

Adjacent rollers, as illustrated in the drawings, have shafts extending from opposite ends, thus one roller is provided with a pinion 18, while the adjacent and coöperating roller is provided with a shaft 19 extended toward the opposite side of the machine from that on which shaft 17 is extended. Pinion 18, as shown in Figs. 4 and 6, meshes with a rack bar 21; while pinion 20, as shown in Figs. 5 and 7, meshes with a rack bar 22 on the opposite side of the machine from rack bar 21. It will be observed that rack bar 21 is arranged beneath roller 18, while rack bar 22 is arranged above pinion 20. Rack bars are provided both at the top of the machine, and underneath, as indicated in Fig. 2.

As indicated by the arrows on Fig. 2, the engagement of the pinions described with the rack bars at the top of the machine causes each pair of adjacent rollers to turn toward each other while at the same time they are being carried forward by the conveyer belt. In consequence, the tops of the vegetable are drawn between the rollers as the conveyer belt moves from pulley 15 to pulley 14, at which point the conveyer belt passes beyond the rack bars. The pinions 18 and 20 having reached the end of the rack bars 21 and 22, release the rollers 11, freeing the tops of the vegetables, so that the vegetables themselves may be picked up by the spaced spring fingers 16, as illustrated in Fig. 2. As the vegetables approach knives 9, the tops rub against brush 25, which tends to draw them taut so that the knives 9 may properly sever the tops from the vegetables. The vegetables roll down into any suitable receptacle, while the tops are carried along in the rollers until the conveyer belt reaches rack bars 21 and 22 at the bottom portion of the machine, where the rollers 11 of each pair are caused to rotate away from each other, and thus discharge the tops, as shown in Fig. 2. I further provide suitable brushes 23 to free the vegetables' roots of dirt.

A suitable drive belt 24, from any suitable engine or motor, operates pulley 2, and carried on the same shaft with pulley 2 is a pulley 26, by which arrangement a direct drive is provided for the conveyer belt.

It is within the contemplation of my invention to make modifications in the method of driving the machine and of other mechanism, without, however, departing from the essential elements and mode of operation herein disclosed.

What I claim is:

1. In a vegetable topping machine, the combination of a conveyer belt having rollers mounted thereon, adjacent rollers being arranged to rotate in reverse directions to engage the vegetable tops at predetermined times, one roller of each pair having a shaft extended from one end, and the other roller having a shaft extended from the other end, a pinion carried by each of said shafts, a rack bar arranged on the under side of one of the pinions, and a second rack bar arranged on the upper side of the other pinion to rotate adjacent rollers toward each other while passing the rack bars described, whereby to cause the rollers to hold the tops of the vegetables.

2. In a vegetable topping machine, the combination of a conveyer belt having rollers mounted thereon, adjacent rollers being arranged to rotate in reverse directions to release the vegetable tops at predetermined times, one roller of each pair having a shaft extended from one end, and the other roller having a shaft extended from the other end, a pinion carried by each of said shafts, a rack bar arranged on the under side of one of the pinions, and a second rack bar arranged on the upper side of the other pinion to rotate adjacent rollers away from each other for a predetermined distance, whereby to cause the rollers to release the tops of the vegetables.

3. In a vegetable topping machine, the combination of a conveyer belt, coöperating rollers arranged in pairs on the conveyer belt and adapted to engage the tops of vegetables as they are fed into the machine, means for rotating adjacent rollers of each pair toward one another to cause them to snugly grasp the tops of the vegetables as the vegetables enter the machine, spaced spring fingers positioned to pick up the vegetables simultaneously with the release of the rollers from their snug engagement with the vegetable tops, knives arranged transversely of the machine to sever the tops of the vegetables, and means for reciprocating the knives.

4. In a vegetable topping machine, the combination of a conveyer belt, rollers arranged to engage the tops of vegetables between adjacent rollers, means for rotating the rollers in reverse directions toward each other for a limited distance, cutting means for severing the tops from the vegetables, a brush device for holding the tops of the vegetables in taut position while being severed, means for thereafter rotating the rollers of each coöperating pair in reverse direction away from each other to release the vegetable tops, substantially as described.

5. In a vegetable topping machine, the combination of a conveyer belt, rollers arranged to engage the tops of vegetables between adjacent rollers as the vegetables enter the machine, means for rotating the rollers of each pair toward each other for a limited distance as they move forward with the conveyer belt, a brush device for holding the tops of the vegetables in taut position, reciprocating cutting mechanism for severing the tops from the vegetables, spaced spring finger holding the vegetables in position for cutting off the tops, means for thereafter causing coöperating rollers of each pair to rotate away from each other for a limited distance to discharge the tops, substantially as set forth.

6. In a vegetable topping machine, the combination of a conveyer belt, brush devices for brushing dirt from the roots of vegetables, rollers carried by the conveyer belt and having means for causing their rotation toward each other to engage the vegetable tops as they are fed into the machine, means for severing the tops from the vegetables, means for thereafter rotating coöperating rollers of each pair in a reverse direction to discharge the vegetable tops, and means directly belted to the engine for actuating the above described mechanism, substantially as set forth.

EPHRAIM BURDICK.

Signed in presence of—
U. A. EATO,
S. L. PATTERSON.

Copies of this patent may be obtained for five cents each, by addressing the "Commissioner of Patents, Washington, D. C."